UNITED STATES PATENT OFFICE.

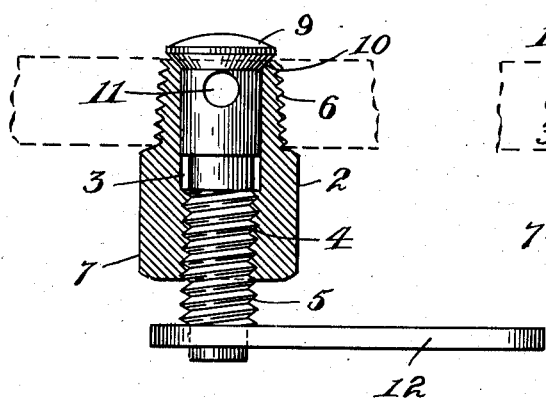
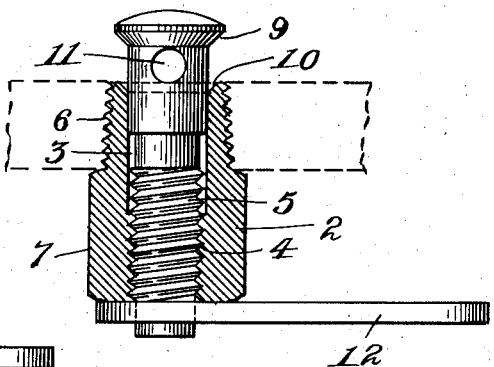
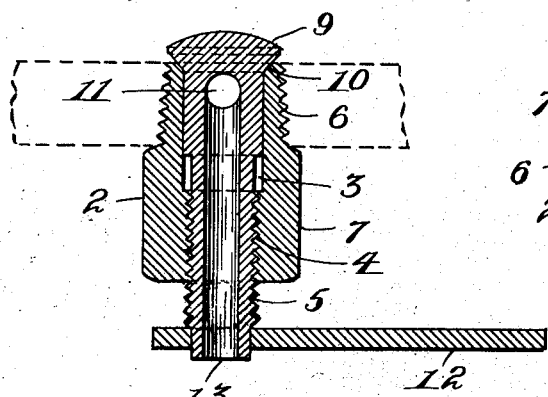
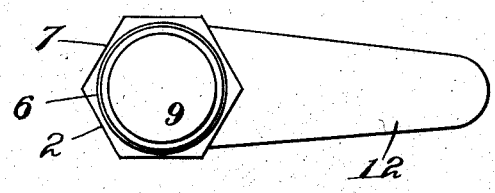
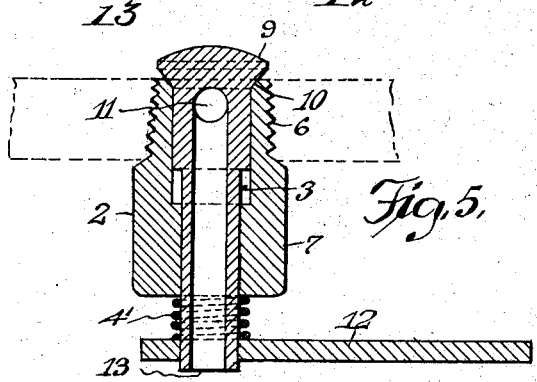

OSCAR A. SMITH, OF CLEVELAND, OHIO.

DRAIN-COCK.

1,345,032.   Specification of Letters Patent.   Patented June 29, 1920.

Application filed April 3, 1919. Serial No. 287,244.

*To all whom it may concern:*

Be it known that I, OSCAR A. SMITH, a citizen of the United States, residing at Cleveland, in the county of Cuyahoga and State of Ohio, have invented certain new and useful Improvements in Drain-Cocks, of which the following is a specification.

This invention relates to drain cocks, the object thereof being to provide an improved structure of this kind in which the body and the valve with its stem may be made as a two-part structure whereby it will be very simple in construction, inexpensive to manufacture, and extremely effective in use, and which is particularly adapted for radiators or carbureters of automobiles, it being so constructed that sediment in the bottom of the radiator or carbureter will not pass into a drain chamber and which sediment when caked on top of the valve will be broken when the valve is opened and thus insure a clear passage for the flow of the water or fluid.

In the drawings accompanying and forming a part of this specification, Figure 1 is a side partly sectional view of the drain cock closed; Fig. 2 is a similar view opened; Fig. 3 is a vertical sectional view of the drain cock; Fig. 4 is a top view looking at the structure from the valve end; and Fig. 5 is a vertical sectional view of the drain cock showing a spring instead of threads for holding the valve on its seat.

Similar characters of reference indicate corresponding parts in the several figures of the drawings.

This improved drain cock comprises a body or casing 2 having a passageway or axial bore 3 therethrough of slightly different diameters, the part having the smaller diameter being provided with interior threads 4 for the reception of a similarly threaded hollow valve stem 5. The body is also provided with suitable exterior threads 6 whereby the drain cock may be fitted into a carbureter, radiator or other structure with which it is to be used, and also with a hexagonal or other form of wrench receiving portion 7 whereby it may be turned into place. Located within the passageway is the valve stem 5 constructed to fit the bore of the body and having at one end a valve 9 suitably flanged or formed to coöperate with and shown herein as overlapping and fitting the valve seat 10 formed on the body. This valve seat may be tapered and the flanged valve correspondingly formed. In some cases however, the valve seat may be located at right angles to the axis of the body which will give a sharp corner to engage the tapered valve. The valve stem 5 at its end, just below the flanged valve head or valve proper, is provided with a transversely extending opening 11, communicating with the interior of the stem which, as stated, is formed hollow. The opposite end of the valve stem is provided with a suitable handle 12 located above the outlet 13 of the valve stem.

From the foregoing it will be observed that when the drain cock is located in the bottom partly illustrated by dotted lines in Figs. 1, 2 and 3 of the drawings of the radiator or carbureter the valve opens in the direction opposite to the flow of the fluid and therefore upwardly, so that should any sediment in the radiator become caked on the top of the valve this sediment will be broken when the valve is opened, and thus permit a clear passage of the water or other fluid through the transverse opening 11 into the hollow stem of the valve through which it passes downwardly and away. Moreover there is no opportunity for any sediment in the bottom of the radiator or carbureter to get into and obstruct a drain chamber.

By forming the structure in the manner described it will be observed that it is not only simple and inexpensive to make but is very compact and affords an ample drain, while at the same time it is incapable of becoming clogged, while the valve on the turning of the handle insures a tight fit on the valve seat, since it practically grinds itself to its seat, and thus is, as it were, a self-seating valve, by which is meant that the valve forms a seat for itself.

It will be understood that the various details may be more or less varied without departing from the spirit or scope of the present improvement, as for instance, the body may have any desired exterior shape or form according to the purpose for which it is to be used, and the handle may be of any suitable shape and secured to the sleeve in any desired way.

Instead of the threads shown, other means may be used for holding the valve on its seat, for instance, the threads 4 may be dispensed with and a spring 4' may be located around the valve stem between a collar formed on the lower end thereof or the handle and the lower end of the body (see Fig. 5) thereby to hold the valve on its seat whereby on compressing the spring the valve will be opened. This form of valve holding means will be practicable for some forms of drain cocks when they are not required to be kept open for any length of time.

In the preferred form of the present improvement it will be observed that one part, as the upper end of the body is provided with a smooth bore, and that the valve stem is likewise provided with a smooth portion to mate with the smooth body bore as hereinbefore stated, while another as the lower part of the body bore is provided with threads to coöperate with similarly formed threads on another, as the lower part of the valve stem, there being a greater number of threads on the valve stem than there are threads on the body bore.

It will also be observed that the body and the valve with its stem comprise a two-part structure, since the construction is such that the valve with its stem may be readily inserted into the body from the valve seat end thereof, and, although the threads may have a somewhat loose fit, this does not affect the effective operation of the device, since when the valve is closed there is no leakage, and when it is open it is immaterial whether there is any leakage past the threads or not, since at this time it is intended that the fluid shall be drained anyhow.

In practice the handle, when such is used, may be secured on the end of the stem in any suitable way desired, as for instance, after the valve with its stem has been inserted into the body the handle may be placed on the squared or other formed end of the stem, and such stem end then headed or spun over.

In the present improvement it will be observed that the water or other fluid passes directly out through the valve stem when the valve is open and not first into a drain chamber around the valve stem, as is the usual practice. When the drain cock is made with a drain chamber around the valve stem sediment usually settles and stops up the drain, frequently requiring it to be opened before it can be used. In short, the present improvement provides a drain cock without a drain chamber, or what may be properly termed a chamberless drain cock.

I claim as my invention:

1. A two-part drain cock comprising a body, a valve adapted to have its head lie adjacent to the surface of the structure in which the body is mounted and having therebelow an integral hollow stem, the body having an axial bore for the stem and a seat for the valve, the valve coöperating with said seat and adapted to open in a direction opposite to the flow of the fluid, the hollow stem having a transverse opening below said valve whereby the fluid is drained through said opening below said valve into and through the stem, the axial bore of the body having a set of threads, and the hollow stem also having a set of threads coöperating therewith.

2. A two-part drain cock comprising a body, a valve adapted to have its head lie adjacent to the surface of the structure in which the body is mounted and having therebelow an integral hollow stem, the body having an axial bore for the stem and a seat for the valve, the valve coöperating with said seat and adapted to open in a direction opposite to the flow of the fluid, the hollow stem having a transverse opening below said valve whereby the fluid is drained through said opening below said valve into and through the stem, the axial bore of the body having a set of threads, and the hollow stem also having a set of threads coöperating therewith, there being a greater number of threads on the valve stem than on the axial bore of the body.

3. A two-part drain cock comprising a body, a valve adapted to have its head lie adjacent to the surface of the structure in which the body is mounted and having therebelow an integral hollow stem, the body having an axial bore for the stem and a valve seat at its upper end for the valve and the valve coöperating with said seat and adapted to open in a direction opposite to the flow of the fluid, the hollow stem having a transverse opening below said valve whereby the fluid is drained through said opening below the valve into and through the stem, and means carried by said stem and coöperating with the body for holding the valve on its seat.

4. A two-part drain cock comprising a body and a valve adapted to have its head lie adjacent to the surface of the structure in which the body is mounted and having therebelow an integral hollow stem, said body having a smooth axial bore at one part thereof and a valve seat at its upper end and the valve coöperating with said seat and adapted to open in a direction opposite to the flow of the fluid, the hollow stem having a smooth portion coöperating with the smooth body bore and a transverse opening below said valve whereby the fluid is drained through said opening below said valve into and through the stem, said body bore and valve stem having below the smooth portions thereof coöperating threads, there being a greater number of threads on the valve stem than on the body bore.

5. A drain cock comprising a body, a valve adapted to have its head lie adjacent to the surface of the structure in which the body is mounted and having therebelow an integral hollow stem, the body having an axial bore for the stem and a seat for the valve, the valve coöperating with said seat and adapted to open in a direction opposite to the flow of the fluid, the hollow stem having a transverse opening below said valve whereby the fluid is drained through said opening below said valve into and through the stem, the axial bore of the body having a set of threads, and the hollow stem also having a set of threads coöperating therewith.

6. A two-part drain cock comprising a body and a valve adapted to have its head lie adjacent to the surface of the structure in which the body is mounted and having therebelow an integral hollow stem, the body having a smooth bore at one part, a threaded bore at another part and a valve seat, and the valve overlapping and fitting said seat and adapted to open in a direction opposite to the flow of the fluid, the hollow stem having at one part a smooth portion mating with the smooth portion of the body bore, threads at another part coöperating with the threaded portion of the body bore and also having a transverse opening below said valve whereby the fluid is drained through said opening below the valve and into and through the stem, the threads on the body and stem being located below the smooth portions of said parts.

7. A drain cock comprising a body having an axial bore and a valve seat at its upper end, a valve adapted to have its head lie adjacent to the surface of the structure in which the body is mounted and coöperating with said seat and adapted to open in a direction opposite to the flow of the fluid and having a hollow stem, said body and stem having coöperating threads at one part, and a handle attachable to the opposite end of said stem below the threads on said stem, said stem having a transverse opening below the valve and in position when the valve is open to permit the fluid to be drained into and through the hollow stem and pass therefrom at the handle end thereof.

8. A drain cock comprising a body and a valve having a hollow stem, said valve adapted to have its head lie adjacent to the surface of the structure in which the body is mounted, the body having an axial bore for the stem and a valve seat at its upper end for the valve and the valve coöperating with said seat and adapted to open in a direction opposite to the flow of the fluid, the hollow stem having a transverse opening below said valve whereby the fluid is drained through said opening below the valve into and through the stem, means carried by said stem and coöperating with the body for holding the valve on its seat, and a handle attachable to the opposite end of said stem and below said last means.

9. The combination with a fluid-carrying receptacle having a bottom for the reception of sediment, of a drain cock comprising a body secured to said bottom, a valve adapted to have its head lie adjacent to the surface of said bottom and having therebelow an integral hollow stem, the body having an axial bore for the stem and a seat for the valve, the valve coöperating with said seat and adapted to open in a direction opposite to the flow of the fluid whereby the opening of the valve will break up and agitate the sediment around the valve in the bottom of the receptacle, the hollow stem having a transverse opening below said valve whereby the fluid is drained through said opening below said valve into and through the stem, and means carried by said stem and coöperating with the body for holding the valve on its seat.

10. The combination with a fluid-carrying receptacle having a bottom for the reception of sediment, of a drain cock comprising a body secured to said bottom, a valve adapted to have its head lie adjacent to the surface of said bottom and having therebelow an integral hollow stem, the body having an axial bore for the stem and a seat for the valve, the valve coöperating with said seat and adapted to open in a direction opposite to the flow of the fluid whereby the opening of the valve will break up and agitate the sediment around the valve in the bottom of the receptacle, the hollow stem having a transverse opening below said valve whereby the fluid is drained through said opening below said valve into and through the stem, the axial bore of the body having a set of threads, and the hollow stem also having a set of threads coöperating therewith.

11. The combination with a fluid-carrying receptacle having a bottom for the reception of sediment, of a two-part drain cock comprising a body secured to said bottom, a valve adapted to have its head lie adjacent to the surface of said bottom and having therebelow an integral hollow stem, the body having an axial bore for the stem and a seat for the valve, the valve coöperating with said seat and adapted to open in a direction opposite to the flow of the fluid whereby the opening of the valve will break up and agitate the sediment around the valve in the bottom of the receptacle, the hollow stem having a transverse opening below said valve whereby the fluid is drained through said opening below said valve into and through the stem, the axial bore of the body having a set of threads, and the hollow stem also having a set of threads coöperating therewith.

Signed at Cleveland in the county of Cuyahoga and State of Ohio this 31st day of March, 1919.

OSCAR A. SMITH.